United States Patent
Qiu et al.

(10) Patent No.: US 11,965,738 B1
(45) Date of Patent: Apr. 23, 2024

(54) DATA ANALYSIS-BASED INTELLIGENT DEFORMATION MONITORING SYSTEM FOR MOUNTAIN LANDSLIDES

(71) Applicant: Northwest University, Xi'an (CN)

(72) Inventors: Haijun Qiu, Xi'an (CN); Yaru Zhu, Xi'an (CN); Dongdong Yang, Xi'an (CN); Zijing Liu, Xi'an (CN); Zhigang Ren, Xi'an (CN); Jianhua Qiang, Xi'an (CN); Shuyue Ma, Xi'an (CN)

(73) Assignee: Northwest University, Xi'an (CN)

( * ) Notice: Subject to any disclaimer, the term of this patent is extended or adjusted under 35 U.S.C. 154(b) by 0 days.

(21) Appl. No.: 18/408,530

(22) Filed: Jan. 9, 2024

(30) Foreign Application Priority Data

Jun. 7, 2023 (CN) .......................... 202310669623.7

(51) Int. Cl.
*G01C 15/00* (2006.01)
(52) U.S. Cl.
CPC .................... *G01C 15/00* (2013.01)
(58) Field of Classification Search
CPC ........ G01C 15/00; G01C 15/008; G01V 1/00; G01W 1/14
See application file for complete search history.

(56) References Cited

U.S. PATENT DOCUMENTS

| | | | | |
|---|---|---|---|---|
| 2015/0331143 A1* | 11/2015 | Han | ....................... | G01B 11/00 702/5 |
| 2018/0045853 A1* | 2/2018 | Kirschbaum | ........... | G01W 1/14 |
| 2022/0383475 A1* | 12/2022 | Dai | ......................... | G06V 10/74 |
| 2022/0392326 A1* | 12/2022 | Qiu | ......................... | G01V 1/006 |
| 2023/0046111 A1* | 2/2023 | Ramesh | ................. | G01V 1/181 |

FOREIGN PATENT DOCUMENTS

| | | |
|---|---|---|
| CN | 115325928 A | 11/2022 |
| CN | 115577984 A | 1/2023 |

OTHER PUBLICATIONS

Notice of Opinion on the First Examination received in Chinese Application No. 202310669623.7, Issued by State Intellectual Property Rights Bureau, dated Jul. 17, 2023, 7 pages.

* cited by examiner

*Primary Examiner* — Lam S Nguyen
(74) *Attorney, Agent, or Firm* — Culhane Meadows PLLC; Robert C. Klinger

(57) ABSTRACT

Disclosed is a data analysis-based intelligent deformation monitoring system for mountain landslides, which solves the technical problem in the prior art that when a landslide occurs in a landslide area, it is not possible to implement region-specific monitoring for landslide soil, thus failing to minimize the real-time impact of the landslide area. The present disclosure involves marking a sub-area where a landslide occurs as a landslide area, marking a real-time sliding direction within the landslide area as a landslide flow direction, setting areas at both sides of the landslide flow direction as landslide slopes, generating a control adjustment signal or a risk monitoring signal through landslide slope analysis, and sending the signal to a server.

1 Claim, 3 Drawing Sheets

DATA ANALYSIS-BASED INTELLIGENT DEFORMATION MONITORING SYSTEM FOR MOUNTAIN LANDSLIDES

CROSS REFERENCE TO RELATED APPLICATION

This patent application claims the benefit and priority of Chinese Patent Application No. 202310669623.7, filed with the China National Intellectual Property Administration on Jun. 7, 2023, the disclosure of which is incorporated by reference herein in its entirety as part of the present application.

TECHNICAL FIELD

The present disclosure relates to the technical field of intelligent deformation monitoring for mountain landslides, and in particular to a data analysis-based intelligent deformation monitoring system for mountain landslides.

BACKGROUND

Landslides are geological events in which rock and soil masses on a slope move along a penetrating shear failure plane. The mechanism of landslides is caused by shear stress on a sliding surface exceeding the shear strength of the surface.

In the existing technology, real-time deformation monitoring is carried out for mountain landslides. However, during the monitoring process, after the occurrence of risks and control measures are taken, accurate monitoring of slope changes in a landslide area is not possible. This results in a failure to promptly implement targeted preventive measures for the real-time development of landslides. Additionally, when a landslide occurs in the landslide area, it is not possible to implement region-specific monitoring for landslide soil, thus failing to minimize the real-time impact of the landslide area.

In view of the technical shortcomings described above, a solution is proposed.

SUMMARY

An objective of the present disclosure is to address the foregoing problems by introducing a data analysis-based intelligent deformation monitoring system for mountain landslides. This system divides a mountainous area into different types of sub-areas based on the composition and characteristics of the mountainous area, and selects suitable detection sensors or detection methods for the different types of mountainous sub-areas, thereby ensuring the accuracy and timeliness of deformation monitoring in the mountainous area, which, in turn, improves the efficiency of intelligent landslide monitoring. Deformation monitoring is conducted in different types of sub-areas to determine whether deformation risks occur in different types of sub-areas. Different monitoring methods are employed for different types of sub-areas, increasing the accuracy of regional deformation monitoring, and making the selection of monitoring methods more targeted while ensuring the efficiency of deformation monitoring. This facilitates cost control of the regional deformation monitoring.

The objective of the present disclosure can be achieved by the following technical solutions:

A data analysis-based intelligent deformation monitoring system for mountain landslides is provided, including a server, which is communicatively connected to the following components:
  a monitoring area classification unit configured to perform classification on a mountainous area to divide the mountainous area into i sub-areas, where i is a natural number greater than 1; obtain respective classification coefficients of the sub-areas within the mountainous area; and classify each of the sub-areas as a low-hardness area or a high-hardness area based on the classification coefficients, and send results to the server;
  a type-specific deformation monitoring unit configured to perform deformation monitoring on the sub-areas of different types; perform analysis to generate a high-hardness area deformation warning signal, a signal indicating that the high-hardness area is stable, a low-hardness area deformation warning signal, and a signal indicating that the low-hardness area is stable, and send the signals to the server;
  a slope deformation analysis unit configured to perform a slope deformation analysis within a landslide area, mark a sub-area where a landslide occurs as a landslide area, mark a real-time sliding direction within the landslide area as a landslide flow direction, set areas at both sides of the landslide flow direction as landslide slopes, generate a control adjustment signal or a risk monitoring signal through landslide slope analysis, and send the signal to the server; and
  a real-time deformation risk monitoring unit configured to monitor risks in a real-time landslide process within the landslide area, analyze the landslide process in the landslide area, divide the landslide area into a front landslide area and a rear landslide area based on the landslide flow direction, perform analysis to generate a signal for control enhancement or a signal indicating no instantaneous risk, and send the signal to the server.

As a preferred implementation of the present disclosure, an operating process of the monitoring area classification unit is as follows:
  collecting a ratio of soft body volume to hard body volume in each sub-area within the mountainous area, as well as a soil moisture content in each sub-area; collecting a daily average soil erosion in each sub-area within the mountainous area; and obtaining the classification coefficient of each sub-area within the mountainous area through analysis;
  comparing the classification coefficient of each sub-area within the mountainous area with a classification coefficient threshold:
  if the classification coefficient of a sub-area within the mountainous area exceeds the classification coefficient threshold, marking the corresponding sub-area as a low-hardness area; if the classification coefficient of a sub-area within the mountainous area does not exceed the classification coefficient threshold, marking the corresponding sub-area as a high-hardness area; and sending corresponding serial numbers of the low-hardness areas and high-hardness areas to the server.

As a preferred embodiment of the present disclosure, an operating process of the type-specific deformation monitoring unit is as follows:
  when a sub-area is a high-hardness area, collecting lateral and vertical extension span values of cracks in the high-hardness area, as well as a frequency of lateral and vertical crack extensions, and comparing the span values with an extension span threshold and comparing the frequency with a lateral and vertical extension threshold:

if the lateral and vertical extension span values of the cracks in the high-hardness area exceed the extension span threshold, or if the frequency of lateral and vertical crack extensions exceeds the lateral and vertical extension threshold, generating a high-hardness area deformation warning signal and sending the high-hardness area deformation warning signal to the server; or if the lateral and vertical extension span values of the cracks in the high-hardness area do not exceed the extension span threshold and the frequency of lateral and vertical crack extensions does not exceed the lateral and vertical extension threshold, generating a signal indicating that the high-hardness area is stable and sending the signal to the server.

As a preferred embodiment of the present disclosure, when a sub-area is a low-hardness area, an operating process of the type-specific deformation monitoring unit is as follows: collecting a soil height deviation between symmetrical regions at both sides within the low-hardness area and a soil erosion difference between symmetrical regions at both sides within the low-hardness area, comparing the soil height deviation with a height difference threshold, and comparing the soil erosion difference with an erosion difference threshold:

if the soil height deviation between the symmetrical regions at both sides within the low-hardness area exceeds the height difference threshold, or if the soil erosion difference between the symmetrical regions at both sides within the low-hardness area exceeds the erosion difference threshold, generating a low-hardness area deformation warning signal and sending the low-hardness area deformation warning signal to the server; and if the soil height deviation between the symmetrical regions at both sides within the low-hardness area does not exceed the height difference threshold, and the soil erosion difference between the symmetrical regions at both sides within the low-hardness area does not exceed the erosion difference threshold, generating a signal indicating that the low-hardness area is stable, and sending the signal to the server.

As a preferred embodiment of the present disclosure, an operating process of the Slope deformation analysis unit is as follows:

collecting an excess lateral movement velocity and an excess landslide flow direction velocity, as well as an excess amount of lateral movement and an excess amount of landslide flow direction movement of the landslide slope in the landslide area during the landslide process, comparing the excess lateral movement velocity and the excess landslide flow direction velocity with an excess velocity threshold, and comparing the excess amount of lateral movement and the excess amount of landslide flow direction movement with an excess movement amount threshold:

if the excess lateral movement velocity and the excess landslide flow direction velocity of the landslide slope in the landslide area during the landslide process exceed the excess velocity threshold, or if the excess amount of lateral movement and the excess amount of landslide flow direction movement exceed the excess movement amount threshold, generating a control adjustment signal and sending the control adjustment signal to the server; or if the excess lateral movement velocity and the excess landslide flow direction velocity of the landslide slope in the landslide area during the landslide process do not exceed the excess velocity threshold, and the excess amount of lateral movement and the excess amount of landslide flow direction movement do not exceed the excess movement amount threshold, generating a risk monitoring signal and sending the risk monitoring signal to the server.

As a preferred embodiment of the present disclosure, an operating process of the real-time deformation risk monitoring unit is as follows:

collecting excess movement velocities corresponding to the front landslide area and rear landslide area within the landslide area, as well as an increase rate of a soil accumulation difference between the rear landslide area and the front landslide area, comparing the excess movement velocities with an excess movement velocity threshold, and comparing the increase rate of the soil accumulation difference with an accumulation difference increase rate threshold:

if the excess movement velocities corresponding to the front landslide area and rear landslide area within the landslide area exceed the excess movement velocity threshold, or if the increase rate of the soil accumulation difference between the rear landslide area and the front landslide area exceeds the accumulation difference increase rate threshold, generating a control reinforcement signal and sending the control reinforcement signal to the server; or if the excess movement velocities corresponding to the front landslide area and rear landslide area within the landslide area do not exceed the excess movement velocity threshold, and the increase rate of the soil accumulation difference between the rear landslide area and the front landslide area does not exceed the accumulation difference increase rate threshold, generating a signal indicating no instantaneous risk and sending the signal to the server.

Compared with the prior art, the beneficial effects of the present disclosure are as follows:

In the present disclosure, classification is performed on the mountainous area based on the composition and characteristics of the mountainous area, and suitable detection sensors or detection methods are selected for different types of mountainous sub-areas, thereby ensuring the accuracy and timeliness of deformation monitoring in the mountainous area, which, in turn, improves the efficiency of intelligent landslide monitoring. Deformation monitoring is conducted in different types of sub-areas to determine whether deformation risks occur in different types of sub-areas. Different monitoring methods are employed for different types of sub-areas, increasing the accuracy of regional deformation monitoring, and making the selection of monitoring methods more targeted while ensuring the efficiency of deformation monitoring. This facilitates cost control of the regional deformation monitoring, and avoids unnecessary cost due to unqualified monitoring efficiency.

In the present disclosure, a landslide area is subject to slope deformation analysis, to determine whether slope deformation occurs in the landslide area during landslide prevention and control, where the slope deformation may lead to changes in regions affected by the landslide area. Failing to adjust the prevention and control measures could result in reduced landslide prevention efficiency and hinder accurate landslide control. Risk monitoring is performed throughout the real-time landslide process of the landslide area, so as to assess whether there is an exacerbation of the current landslide process. This allows for the adjustment of control measures for the landslide process. Prompt adjustment of the control measures reduces the risk of the control measures becoming ineffective and prevents an increase in landslide impacts, where increased landslide impacts may cause the current control measures to be ineffective, leading to more severe landslide impacts.

BRIEF DESCRIPTION OF THE DRAWINGS

The present disclosure will be further described with reference to the accompanying drawings for the convenience of understanding by those skilled in the art.

DETAILED DESCRIPTION OF THE EMBODIMENTS

To enable those skilled in the art to better understand the solutions in the present disclosure, the technical solutions in the examples of the present disclosure will be clearly and completely described below with reference to the accompanying drawings in the examples of the present disclosure. Apparently, the described examples are merely some rather than all of the examples of the present disclosure. All other embodiments obtained by those of ordinary skill in the art based on the embodiments of the present disclosure without creative efforts should fall within the protection scope of the present disclosure.

When an "embodiment" is mentioned herein, specific features, structures, or characteristics described in conjunction with the example may be included in at least one embodiment of the present disclosure. The phrase appearing in different parts of the specification does not necessarily refer to the same embodiment or an independent or alternative embodiment exclusive of other embodiments. It may be explicitly or implicitly appreciated by those skilled in the art that the embodiments described herein may be combined with another embodiment.

Figure 1:
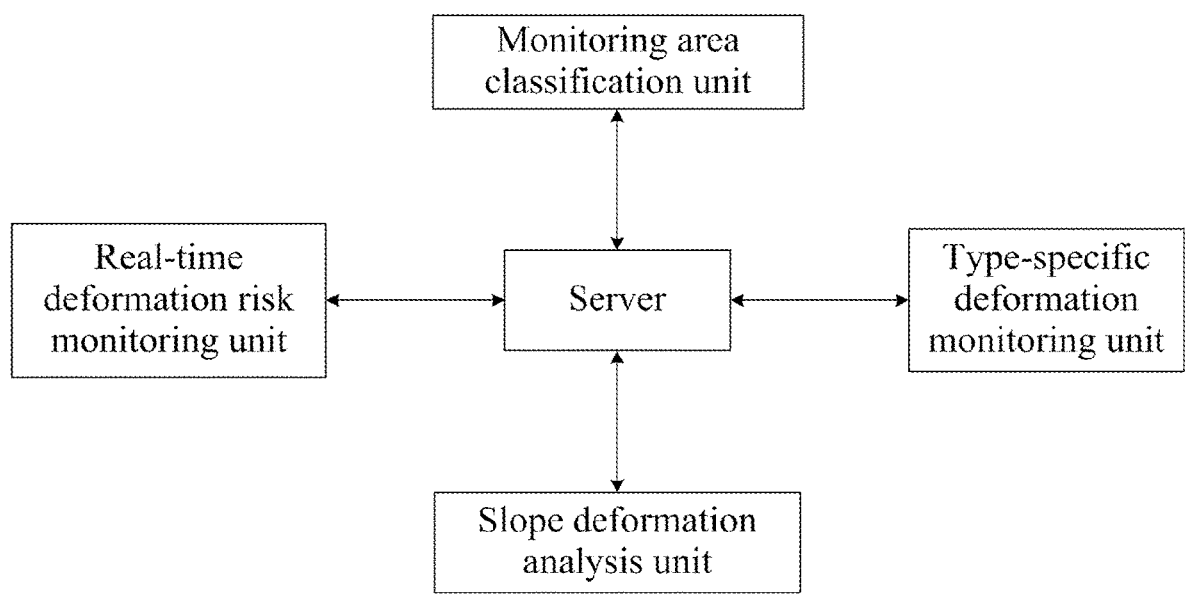
FIG. 1 is a block diagram of an overall principle of the present disclosure.

As shown in FIG. 1, a data analysis-based intelligent deformation monitoring system for mountain landslides is provided, including a server, which is communicatively connected to a monitoring area classification unit, a type-specific deformation monitoring unit, a slope deformation analysis unit, and a real-time deformation risk monitoring unit. The connections from the server to the monitoring area classification unit, the type-specific deformation monitoring unit, the slope deformation analysis unit, and the real-time deformation risk monitoring unit are all two-way communication connections. This system is used for deformation monitoring in a mountainous area, and also for analysis of landslide impacts in the mountainous area after deformation occurs in the mountainous area.

Embodiment 1

Figure 2:
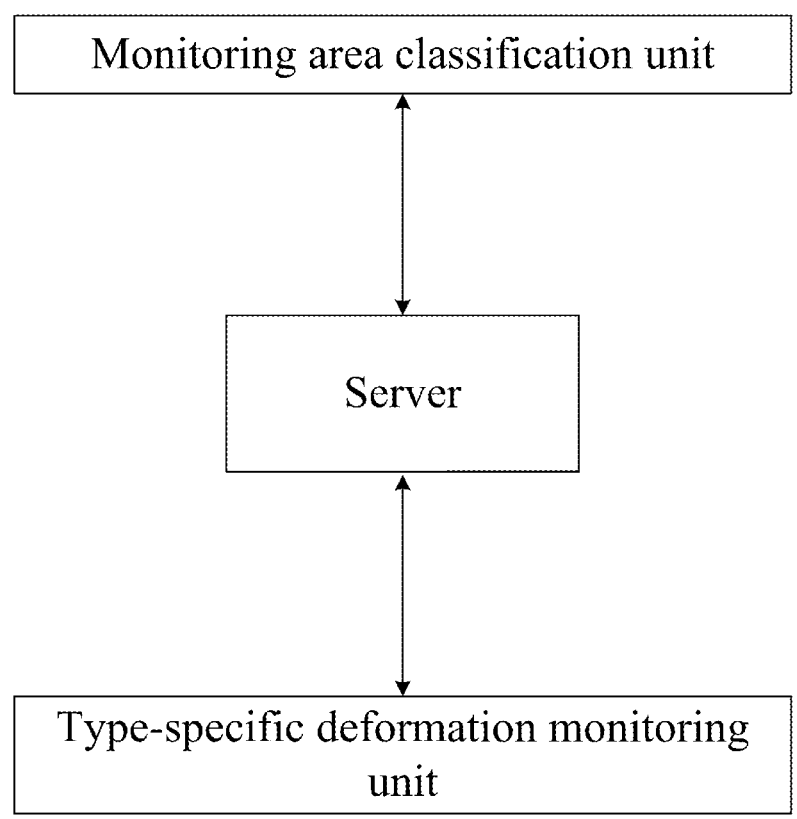
FIG. 2 is a block diagram of a principle of Embodiment 1 of the present disclosure.

As shown in FIG. 2, after setting a mountainous area to be monitored, the server generates a monitoring area classification signal and sends the monitoring area classification signal to the monitoring area classification unit. After receiving the monitoring area classification signal, the monitoring area classification unit performs classification on the mountainous area based on the composition and characteristics of the mountainous area, and selects suitable detection sensors or detection methods for different types of mountainous sub-areas, thereby ensuring the accuracy and timeliness of deformation monitoring in the mountainous area, which, in turn, improves the efficiency of intelligent landslide monitoring.

The mountainous area is divided into i sub-areas, where i is a natural number greater than 1, and the size deviation of each sub-area does not exceed a preset deviation. A ratio of soft body volume to hard body volume in each sub-area within the mountainous area, and a soil moisture content in each sub-area are collected, where the ratio of soft body volume to hard body volume in each sub-area within the mountainous area is denoted as $TB_i$, and the soil moisture content in each sub-area is denoted as $HS_i$. The soft body represents components such as earth and mud, and the hard body represents components such as rocks and stones. A daily average soil erosion in each sub-area within the mountainous area is collected, which is denoted as $LS_i$.

A classification coefficient $V_i$ of each sub-area within the mountainous area through the formula as follows:

$$V_i = \beta \left( TB_i \times fe1 + \frac{1}{HS_i \times fe2} + LS_i \times fe3 \right) \times (fe1 + fe2 + fe3),$$

where fe1, fe2, and fe3 are preset ratio coefficients, which are all greater than zero, where fe1+fe2+fe3>0; $\beta$ is an error correction factor, which is set to 1.256.

The classification coefficient $V_i$ of each sub-area within the mountainous area is compared with a classification coefficient threshold:

If the classification coefficient $V_i$ of a sub-area within the mountainous area exceeds the classification coefficient threshold, the corresponding sub-area is marked as a low-hardness area; if the classification coefficient $V_i$ of a sub-area within the mountainous area does not exceed the classification coefficient threshold, the corresponding sub-area is marked as a high-hardness area.

Corresponding serial numbers of the low-hardness areas and high-hardness areas are sent to the server.

After receiving the corresponding serial numbers of the low-hardness areas and high-hardness areas, the server generates a type-specific deformation monitoring signal, and sends the type-specific deformation monitoring signal to the type-specific deformation monitoring unit. After receiving the type-specific deformation monitoring signal, the type-specific deformation monitoring unit performs deformation monitoring in different types of sub-areas to determine whether deformation risks occur in different types of sub-areas. Different monitoring methods are employed for different types of sub-areas, increasing the accuracy of regional deformation monitoring, and making the selection of monitoring methods more targeted while ensuring the efficiency of deformation monitoring. This facilitates cost control of the regional deformation monitoring, and avoids unnecessary cost due to unqualified monitoring efficiency.

When a sub-area is a high-hardness area, lateral and vertical extension span values of cracks in the high-hardness area, as well as a frequency of lateral and vertical crack extensions; and comparing the span values with an extension span threshold and comparing the frequency with a lateral and vertical extension threshold:

If the lateral and vertical extension span values of the cracks in the high-hardness area exceed the extension span threshold, or if the frequency of lateral and vertical crack extensions exceeds the lateral and vertical extension threshold, it is determined that the current sub-area has a deformation risk, and a high-hardness area deformation warning signal is generated and sent to the server. If the lateral and vertical extension span values of the cracks in the high-hardness area do not exceed the extension span threshold and the frequency of lateral and vertical crack extensions does not exceed the lateral and vertical extension threshold, it is determined that the current sub-area has no deformation risk, and a signal indicating that the high-hardness area is stable is generated and sent to the server.

When a sub-area is a low-hardness area, a soil height deviation between symmetrical regions at both sides within the low-hardness area and a soil erosion difference between symmetrical regions at both sides within the low-hardness area are collected; the soil height deviation between the symmetrical regions at both sides within the low-hardness area is compared with a height difference threshold, and the soil erosion difference between the symmetrical regions at both sides within the low-hardness area is compared with an erosion difference threshold:

If the soil height deviation between the symmetrical regions at both sides within the low-hardness area exceeds the height difference threshold, or if the soil erosion difference between the symmetrical regions at both sides within the low-hardness area exceeds the erosion difference threshold, it is determined that the low-hardness area has a deformation risk, and a low-hardness area deformation warning signal is generated and sent to the server.

If the soil height deviation between the symmetrical regions at both sides within the low-hardness area does not exceed the height difference threshold, and the soil erosion difference between the symmetrical regions at both sides within the low-hardness area does not exceed the erosion difference threshold, it is determined that the low-hardness area has no deformation risk, and a signal indicating that the low-hardness area is stable is generated and sent to the server.

After receiving the low-hardness area deformation warning signal or the high-hardness area deformation warning signal, the server performs landslide control on the corresponding sub-area, and selects a suitable landslide control method according to the type of the sub-area. For the high-hardness area, control points can be set up and supported. For the low-hardness area, a control network can be set up to provide overall coverage for the corresponding area, thus reducing a landslide risk.

Embodiment 2

Figure 3:
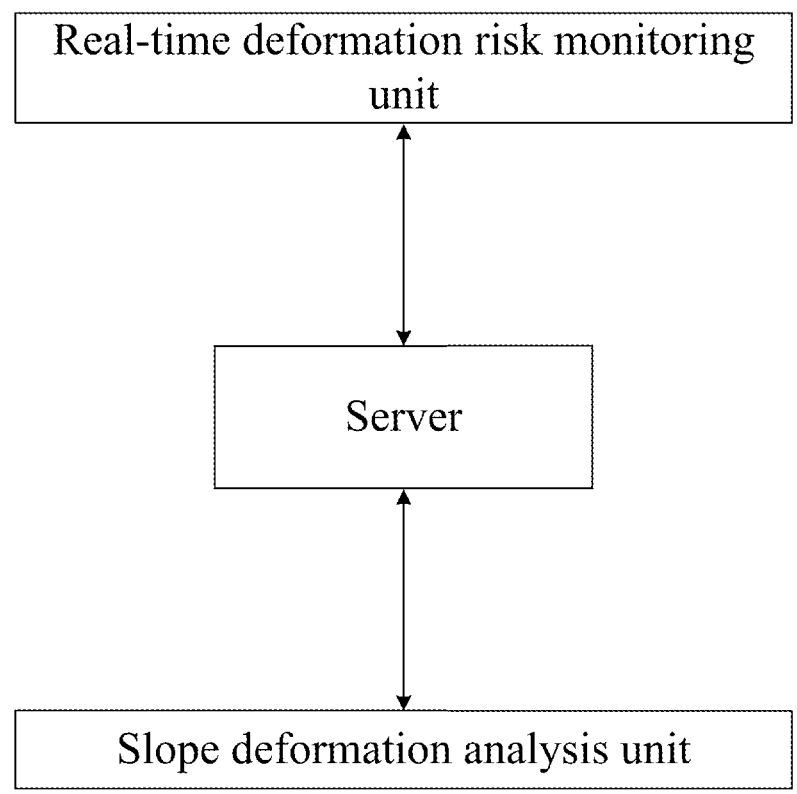
FIG. 3 is a block diagram of a principle of Embodiment 2 of the present disclosure.

As shown in FIG. 3, after the occurrence of a landslide in the mountainous area and the completion of control measures, the server generates a slope deformation analysis signal and sends the slope deformation analysis signal to the slope deformation analysis unit. After receiving the slope deformation analysis signal, the slope deformation analysis unit performs slope deformation analysis to determine whether slope deformation occurs in the landslide area during landslide prevention and control, where the slope deformation may lead to changes in regions affected by the landslide area. Failing to adjust the prevention and control measures could result in reduced landslide prevention efficiency and hinder accurate landslide control.

A sub-area where the landslide occurs is marked as a landslide area, a real-time sliding direction within the landslide area is marked as a landslide flow direction, and areas at both sides of the landslide flow direction are set as landslide slopes. An excess lateral movement velocity and an excess landslide flow direction velocity, as well as an excess amount of lateral movement and an excess amount of landslide flow direction movement of the landslide slope in the landslide area during the landslide process are collected. The excess lateral movement velocity and the excess landslide flow direction velocity are compared with an excess velocity threshold, and the excess amount of lateral movement and the excess amount of landslide flow direction movement are compared with an excess movement amount threshold, where a lateral direction of the landslide slope indicates a horizontal direction perpendicular to the landslide flow direction.

If the excess lateral movement velocity and the excess landslide flow direction velocity of the landslide slope in the landslide area during the landslide process exceed the excess velocity threshold, or if the excess amount of lateral movement and the excess amount of landslide flow direction movement exceed the excess movement amount threshold, it is determined that regions affected by the landslide area have a changing trend, and a control adjustment signal is generated and sent to the server. After receiving the control adjustment signal, the server adjusts control regions of the landslide area based on a real-time slope deformation amount of the landslide area, and rationally allocates control resources of the real-time landslide area, so as to minimize the landslide impacts.

If the excess lateral movement velocity and the excess landslide flow direction velocity of the landslide slope in the landslide area during the landslide process do not the excess velocity threshold, and the excess amount of lateral movement and the excess amount of landslide flow direction movement do not exceed the excess movement amount threshold, it is determined that the regions affected by the landslide area have no changing trend, and a risk monitoring signal is generated and sent to the server.

After receiving the risk monitoring signal, the server transfers it to the real-time deformation risk monitoring unit. After receiving the risk monitoring signal, the real-time deformation risk monitoring unit performs risk monitoring throughout the real-time landslide process of the landslide area, so as to assess whether there is an exacerbation of the current landslide process, thereby adjusting control measures for the landslide process. Prompt adjustment of the control measures reduces the risk of the control measures becoming ineffective and prevents an increase in landslide impacts, where increased landslide impacts may cause the current control measures to be ineffective, leading to more severe landslide impacts.

The landslide process in the landslide area is analyzed, and the landslide area is divided into a front landslide area and a rear landslide area based on the landslide flow direction. The division may be conducted based on an area size or an area landslide moment. That is, an area size threshold can be set, where a front part within the landslide area is defined as the front landslide area, and a rear part within the landslide area is defined as the rear landslide area. Excess movement velocities corresponding to the front landslide area and rear landslide area within the landslide area, and an increase rate of a soil accumulation difference between the rear landslide area and the front landslide area are collected. The excess movement velocities corresponding to the front landslide area and rear landslide area within the landslide area are compared with an excess movement velocity threshold, and the increase rate of the soil accumulation difference between the rear landslide area and the front landslide area is compared with an accumulation difference increase rate threshold:

If the excess movement velocities corresponding to the front landslide area and rear landslide area within the landslide area exceed the excess movement velocity threshold, or if the increase rate of the soil accumulation difference between the rear landslide area and the front landslide area exceeds the accumulation difference increase rate threshold, it is determined that the landslide area has an instantaneous high impact risk, and a control reinforcement signal is generated and sent to the server. After receiving the control reinforcement signal, the server reinforces control over the corresponding landslide area, that is, increases the number of support points or the number of control regions.

If the excess movement velocities corresponding to the front landslide area and rear landslide area within the landslide area do not exceed the excess movement velocity threshold, and the increase rate of the soil accumulation difference between the rear landslide area and the front landslide area does not exceed the accumulation difference increase rate threshold, it is determined that the landslide area has no instantaneous high risk, and a signal indicating no instantaneous risk is generated and sent to the server.

Each of the foregoing formulas is derived from software simulation based on extensive data collection, and closely approximates real-world values. Coefficients in the formulas are set by persons skilled in the art according to actual situations.

When the present disclosure is put into practice, the monitoring area classification unit performs classification on a mountainous area to divide the mountainous area into i sub-areas, where i is a natural number greater than 1, obtains respective classification coefficients of the sub-areas within the mountainous area, classifies each of the sub-areas as a low-hardness area or a high-hardness area based on the classification coefficients, and sends results to the server. The type-specific deformation monitoring unit performs deformation monitoring on the sub-areas of different types, performs analysis to generate a high-hardness area deformation warning signal, a signal indicating that the high-hardness area is stable, a low-hardness area deformation warning signal, and a signal indicating that the low-hardness area is stable, and sends the signals to the server. The slope deformation analysis unit performs a slope deformation analysis within a landslide area, marks a sub-area where a landslide occurs as a landslide area, marks a real-time sliding direction within the landslide area as a landslide flow direction, sets areas at both sides of the landslide flow direction as landslide slopes, generates a control adjustment signal or a risk monitoring signal through landslide slope analysis, and sends the signal to the server. The real-time deformation risk monitoring unit monitors risks in a real-time landslide process within the landslide area, analyzes the landslide process in the landslide area, divides the landslide area into a front landslide area and a rear landslide area based on the landslide flow direction, performs analysis to generate a signal for control enhancement or a signal indicating no instantaneous risk, and sends the signal to the server.

The preferred embodiments of the present disclosure disclosed above are only used to help illustrate the present disclosure. The preferred embodiments neither describe all the details in detail, nor limit specific implementations of the present disclosure. Obviously, many modifications and changes may be made based on the content of the present specification. In the present specification, these embodiments are selected and specifically described to better explain the principle and practical application of the present disclosure, so that a person skilled in the art can well understand and use the present disclosure. The present disclosure is only limited by the claims and the full scope and equivalents thereof.

What is claimed is:

1. A data analysis-based intelligent deformation monitoring system for mountain landslides, comprising a server, which is communicatively connected to the following components:
   a monitoring area classification unit configured to perform classification on a mountainous area to divide the mountainous area into i sub-areas, wherein i is a natural number greater than 1; obtain respective classification coefficients of the sub-areas within the mountainous area; and classify each of the sub-areas as a low-hardness area or a high-hardness area based on the classification coefficients, and send results to the server;
   a type-specific deformation monitoring unit configured to perform deformation monitoring on the sub-areas of different types, generate a high-hardness area deformation warning signal, a signal indicating that the high-hardness area is stable, a low-hardness area deformation warning signal, and a signal indicating that the low-hardness area is stable through analysis, and send the signals to the server;
   a slope deformation analysis unit configured to perform a slope deformation analysis within a landslide area, mark a sub-area where a landslide occurs as a landslide area, mark a real-time sliding direction within the landslide area as a landslide flow direction, set areas at both sides of the landslide flow direction as landslide slopes, generate a control adjustment signal or a risk monitoring signal through landslide slope analysis, and send the signal to the server; and
   a real-time deformation risk monitoring unit configured to monitor risks in a real-time landslide process within the landslide area, analyze the landslide process in the landslide area, divide the landslide area into a front landslide area and a rear landslide area based on the landslide flow direction, perform analysis to generate a signal for control enhancement or a signal indicating no instantaneous risk, and send the signal to the server;
   wherein an operating process of the monitoring area classification unit is as follows:
   collecting a ratio of soft body volume to hard body volume in each sub-area within the mountainous area, as well as a soil moisture content in each sub-area; collecting a daily average soil erosion in each sub-area within the mountainous area; and obtaining the classification coefficient of each sub-area within the mountainous area through analysis; and
   comparing the classification coefficient of each sub-area within the mountainous area with a classification coefficient threshold:
   if the classification coefficient of a sub-area within the mountainous area exceeds the classification coefficient threshold, marking the corresponding sub-area as a low-hardness area; if the classification coefficient of a sub-area within the mountainous area does not exceed the classification coefficient threshold, marking the corresponding sub-area as a high-hardness area; and sending corresponding numbers of the low-hardness areas and high-hardness areas to the server;

an operating process of the type-specific deformation monitoring unit is as follows:

when a sub-area is a high-hardness area, collecting lateral and vertical extension span values of cracks in the high-hardness area, as well as a frequency of lateral and vertical crack extensions; and comparing the span values with an extension span threshold and comparing the frequency with a lateral and vertical extension threshold:

if the lateral and vertical extension span values of the cracks in the high-hardness area exceed the extension span threshold, or if the frequency of lateral and vertical crack extensions exceeds the lateral and vertical extension threshold, generating a high-hardness area deformation warning signal and sending the high-hardness area deformation warning signal to the server; or if the lateral and vertical extension span values of the cracks in the high-hardness area do not exceed the extension span threshold and the frequency of lateral and vertical crack extensions does not exceed the lateral and vertical extension threshold, generating a signal indicating that the high-hardness area is stable and sending the signal to the server;

when a sub-area is a low-hardness area, a soil height deviation between symmetrical regions at both sides within the low-hardness area and a soil erosion difference between symmetrical regions at both sides within the low-hardness area are collected, and the soil height deviation is compared with a height difference threshold, and the soil erosion difference is compared with an erosion difference threshold:

if the soil height deviation between the symmetrical regions at both sides within the low-hardness area exceeds the height difference threshold, or if the soil erosion difference between the symmetrical regions at both sides within the low-hardness area exceeds the erosion difference threshold, a low-hardness area deformation warning signal is generated and the low-hardness area deformation warning signal is sent to the server; and if the soil height deviation between the symmetrical regions at both sides within the low-hardness area does not exceed the height difference threshold, and the soil erosion difference between the symmetrical regions at both sides within the low-hardness area does not exceed the erosion difference threshold, a signal indicating that the low-hardness area is stable is generated, and the signal is sent to the server; wherein after receiving the low-hardness area deformation warning signal or high-hardness area deformation warning signal, the server performs landslide control on the corresponding sub-area, and selects a suitable landslide control method according to a type of the sub-area, wherein for the high-hardness area, control points are set up and supported, and for the low-hardness area, a control network is set up to provide overall coverage for the corresponding area, thereby reducing a landslide risk;

an operating process of the slope deformation analysis unit is as follows:

collecting an excess lateral movement velocity and an excess landslide flow direction velocity, as well as an excess amount of lateral movement and an excess amount of landslide flow direction movement of the landslide slope in the landslide area during the landslide process, comparing the excess lateral movement velocity and the excess landslide flow direction velocity with an excess velocity threshold, and comparing the excess amount of lateral movement and the excess amount of landslide flow direction movement with an excess movement amount threshold:

if the excess lateral movement velocity and the excess landslide flow direction velocity of the landslide slope in the landslide area during the landslide process exceed the excess velocity threshold, or if the excess amount of lateral movement and the excess amount of landslide flow direction movement exceed the excess movement amount threshold, generating a control adjustment signal and sending the control adjustment signal to the server, wherein after receiving the control adjustment signal, the server adjusts control regions of the landslide area based on a real-time slope deformation amount of the landslide area, and rationally allocates control resources of the real-time landslide area, so as to minimize landslide impacts; or if the excess lateral movement velocity and the excess landslide flow direction velocity of the landslide slope in the landslide area during the landslide process do not exceed the excess velocity threshold, and the excess amount of lateral movement and the excess amount of landslide flow direction movement do not exceed the excess movement amount threshold, generating a risk monitoring signal and sending the risk monitoring signal to the server; and an operating process of the real-time deformation risk monitoring unit is as follows:

collecting excess movement velocities corresponding to the front landslide area and rear landslide area within the landslide area, as well as an increase rate of a soil accumulation difference between the rear landslide area and the front landslide area, comparing the excess movement velocities with an excess movement velocity threshold, and comparing the increase rate of the soil accumulation difference with an accumulation difference increase rate threshold:

if the excess movement velocities corresponding to the front landslide area and rear landslide area within the landslide area exceed the excess movement velocity threshold, or if the increase rate of the soil accumulation difference between the rear landslide area and the front landslide area exceeds the accumulation difference increase rate threshold, generating a control reinforcement signal and sending the control reinforcement signal to the server, wherein after receiving the control reinforcement signal, the server reinforces control over the corresponding landslide area, that is, increases the number of support points or the number of control regions; or if the excess movement velocities corresponding to the front landslide area and rear landslide area within the landslide area do not exceed the excess movement velocity threshold, and the increase rate of the soil accumulation difference between the rear landslide area and the front landslide area does not exceed the accumulation difference increase rate threshold, generating a signal indicating no instantaneous risk and sending the signal to the server.

* * * * *